United States Patent [19]
Olsson

[11] 3,800,311
[45] Mar. 26, 1974

[54] SELF-DEVELOPING SHEET FILM MAGAZINE FOR USE ON A ROLLFILM CAMERA

[75] Inventor: Kurt Ove Olsson, Goteborg, Sweden

[73] Assignee: Fritz Victor Hasselblad, Goteborg, Sweden

[22] Filed: Jan. 8, 1973

[21] Appl. No.: 322,046

[30] Foreign Application Priority Data
Jan. 12, 1972 Sweden.................................. 483/72

[52] U.S. Cl..................... 354/174, 95/13, 95/31 R, 95/44 R
[51] Int. Cl. ........................................... G03b 19/10
[58] Field of Search ..................... 95/19, 13, 31, 44

[56] References Cited
UNITED STATES PATENTS
1,357,363  11/1920  Teitzel................................... 95/19
3,160,083  12/1964  Neumeister..................... 95/31 R X
3,491,671  1/1970  Engeldrum........................ 95/31 R Primary Examiner—Richard M. Sheen
Attorney, Agent, or Firm—Elliott I. Pollock

[57] ABSTRACT

A camera having a housing and lens means defining a focal plane normally cooperating with a film magazine for roll film is provided with a further magazine for sheet film adapted to be detachably secured to the housing in replacement of the roll film magazine. The sheet film in the further magazine is disposed in a film plane parallel to and rearward of the camera focal plane when the further magazine is secured to the housing; and a glass plate is mounted on the further magazine between the sheet film plane and the camera focal plane for effectively displacing the focal plane of the camera rearwardly substantially to the film plane of the sheet film in the further magazine.

5 Claims, 5 Drawing Figures

SELF-DEVELOPING SHEET FILM MAGAZINE FOR USE ON A ROLLFILM CAMERA

BACKGROUND OF THE INVENTION

This invention relates to photographic cameras of the type employing exchangeable film magazines for rollfilm, and refers to a device rendering it possible to utilize in such cameras film magazines with sheet film therein, preferably magazines which contain self-developing film. The invention, more precisely, relates to a transparent plate, for example of glass, mounted in front of the film in the sheet film magazine and provided to compensate for focal errors due to the film plane of the sheet film being located a short distance behind the focal plane of the camera.

When taking pictures with high requirements on their composition and the object lighting, it is in many cases desirable or necessary at first to make a trial exposure and to develop it to provide a control of the result. This is particularly important when using flash, as its effect is difficult to judge in advance. If no such trial exposure is made, and the result proves unsatisfactory, a retake must be made at a later occasion, provided there is such an occasion. As this involves much extra costs and work, usually one makes a trial exposure and, if necessary, adjusts the composition or lighting factors in view of the result.

For the final picture, one must have a negative adapted for reproduction and in most cases also for enlargement. This requires conventional — black and white or colour — film material and a camera adapted for such conventional film material. By making a trial exposure, as mentioned above, expensive retakes can be avoided. Rush developing and printing the trial exposure with conventional material takes at least 10–15 minutes. During this time the studio space is occupied and the studio personnel have to wait, which involves substantial extra costs. For reducing these costs it is known to use for the trial exposure self-developing film, which cuts the waiting time to a few minutes. The trial exposure either is made with a camera adapted for self-developing film, or with the rear part of a self-developing camera attached to a camera for conventional film. The latter alternative is preferred as it does not require any displacement of the camera position. Heretofore, one had to make some minor adjustments in the camera box, which is not desirable.

SUMMARY OF THE INVENTION

The present invention has as its object to provide a modified self-developing sheet film magazine for use on a photographic camera of the type normally employing exchangeable film magazines for conventional rollfilm. The camera box surface facing the rollfilm magazine is provided with a pair of projecting catches for securing the film magazine, and also includes an outwardly projecting trigger rod for controlling the mechanism in the film magazine. A modification of these projecting details on the camera box would render the application of the rollfilm magazine difficult or impossible. The modification, therefore, is preferably made, e.g., for cost reasons, on the film magazine for sheet film, which is relatively uncomplicated and, therefore, less expensive. Suitable holders for the catches can be mounted on the sheet film magazine without difficulty and are not concerned by this invention. The trigger rod, however, projects from the camera box by a distance which is so long that, at exposure, it would contact the filmpack and compress the same. If the sheet film magazine were so mounted on the camera box that the film plane and the focal plane of the camera coincide, the sheet film would be moved out of the camera focal plane by said compression of the filmpack. In order to avoid the blur resulting from such a displacement, the sheet film magazine according to the invention is mounted on the camera box in such a manner, that the film plane is located a short distance behind the camera focal plane, so that the trigger rod can move freely. The blur due to the extended distance between the camera lens and the film plane is compensated for according to the invention, by a planeparallel glass plate which is mounted in front of the film plane.

According to the laws of optics, a light ray passing through a glass plate is subject to parallel displacement, which seemingly shortens the distance between the lens and the film plane. By suitably adjusting the glass plate thickness in relation to the refraction index of the glass and to the size of the displacement of the film plane out of the focal plane of the camera lens, one obtains approximatively the correction desired for receiving a substantially sharp picture. For receiving a picture of full sharpness, according to the laws of optics the glass plate should actually be replaced by a negative lens. The blur due to the approximation achieved with a planeparallel glass plate is, however, of no practical importance for the application field mentioned above in the introductory portion. Besides, in the practical case the deviations are smaller than, or at maximum equal to a the deviations in the film flatness which in films of self-developing type are smaller than in conventional films.

BRIEF DESCRIPTION OF THE DRAWINGS

A preferred embodiment of the invention is described in greater detail in the following, with reference to the accompanying drawings, in which FIG. 1 in a schematic way shows the ray path in a device according to the invention.

DESCRIPTION OF THE PREFERRED EMBODIMENTS

Figure 4:
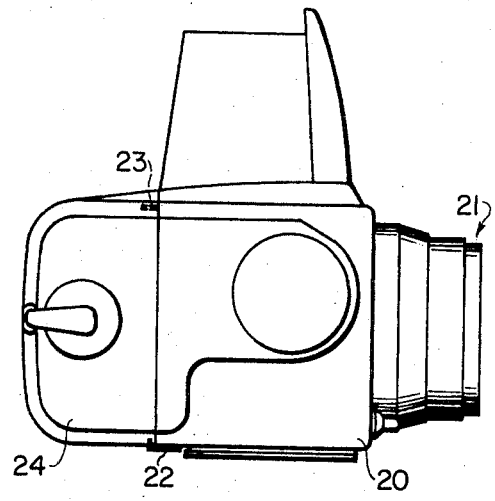
FIG. 4 depicts a camera of the type employed in the present invention, having a rollfilm magazine mounted thereon.
Figure 5:
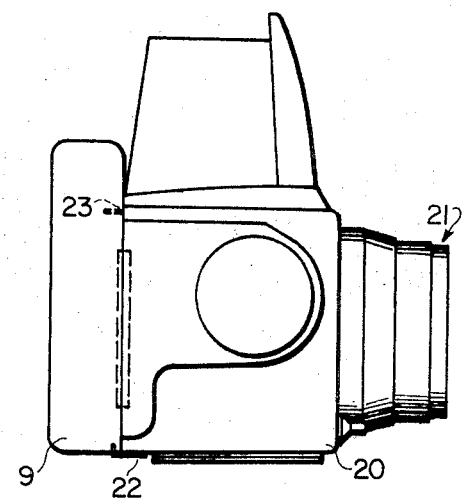
FIG. 5 depicts the camera of FIG. 4 with a sheet film magazine mounted thereon in accordance with the present invention.

FIG. 4 depicts a camera of the general type with which the present invention is concerned. The camera includes a housing 20 having a lens 21 thereon. The lower rearward edge of the housing is provided with a projecting catch 22, and the upper rearward edge of the housing is provided with a projecting catch 23, for detachably securing a rollfilm magazine 24 so that successive frames of the rollfilm in magazine 24 can be positioned at the camera focal plane rearwardly of lens 21. The rollfilm magazine 24 is removable from the housing and, under the circumstances described previously, can be replaced by a sheet film magazine 9 (see FIG. 5) which is secured to the camera housing 20 by the aforementioned catches 22, 23, and which contains sheets of film of the so-called self-developing type. When a sheet film magazine 25 is substituted for rollfilm magazine 24, however, the forwardmost sheet of film in magazine 9 is, for the reasons discussed previously, located in a film plane which is a short distance behind the camera focal plane. In accordance with the present invention, therefore, rollfilm magazine 24 includes optical means operative to effectively displace the focal plane of the camera rearwardly substantially to the film plane of the sheet film in magazine 9, thereby to render magazines 24 and 9 directly interchangeable without the need for structural modification of the camera itself.

Figure 1:
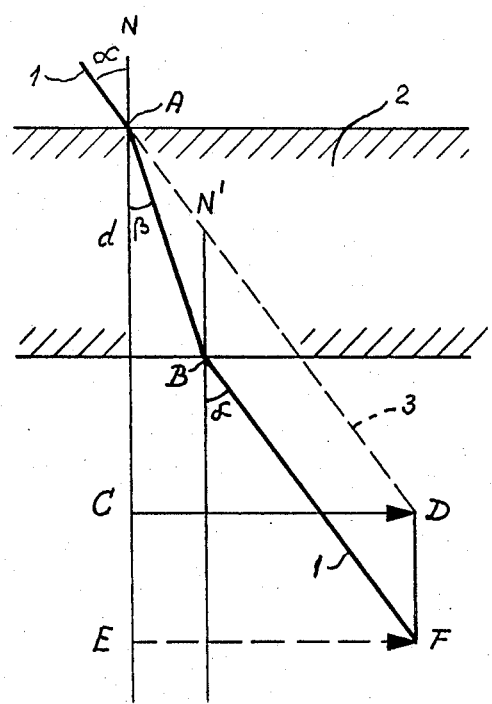

The optical principle of the invention appears from FIG. 1 where a light ray 1 obliquely incident from the camera lens meets a planeparallel glass plate 2 disposed in front of the film plane and in parallel therewith. Said plate 2 has a thickness $d$ and a refraction index $n$. If we assume that the light ray is incident on the plate at point A at an angle $\alpha$ with a normal N—N through the point A the refractive index of plate 2 is such that, due to the transition from air to glass the light ray 1 is refracted relative to the normal N—N to form the angle $\beta$ with the normal during its passage through the glass plate 2. The light ray 1 emerges from the glass plate 2 at a point B and thereby in known manner is refracted to a corresponding degree from a normal N' — N' through the point B and forms at its emergence the angle $\alpha$ with the normal N' — N'. The incident light ray 1, thus, is displaced from its original plane into a parallel plane by reason of its passage through the glass plate 2, as appears from the dashed-line extension 3 of the incident ray 1. A line C-D represents the correct position of the film plane in an unmodified sheet film magazine without the glass plate 2, and a second line E-F of equal length represents the correct position of the film plane in a modified magazine with the glass plate 2. As appears from FIG. 1, in order to make the lines C-D and E-F equally long, according to laws of optics the line E-F must be moved by a distance C-E beyond the focal plane of the camera. In other words, one can move the film plane in the direction away from the lens by mounting the glass plate 2 in the ray path in front of the film plane and thereby, according to the invention, provide sufficient space for a trigger rod projecting out of the camera box to move without reaching the film plane.

The distance C-E is easily calculated when knowing the angle of incidence $\alpha$, the thickness d of the glass plate 2 and the refraction index $n$ of the glass. It is known, too, that the length C-E is not constant at different angles of incidence $\alpha$. For meeting this requirement, according to the laws of optics, the thickness $d$ should be increased successively with the angle $\alpha$, so that instead of the planeparallel plate 2 a negative lens would be obtained. Such a lens preferably would be given a slightly plane-concave shape, its plane surface facing the film plane. This, however, would substantially increase the costs of the arrangement. As already mentioned above in the introductory portion, such a lens is not necessary for the moderate requirements of picture sharpness in the application field described, and in the practical case the maximum aberration is insignificant. In a practical example, a glass plate having a thickness $d = 4$ mm and a refraction index $n = 1.5$ shifts the position of the film plane from normally 3.50 mm from the contact surface of the camera box to 4.85 mm, so that a trigger rod projecting from the camera box can move, at the time of exposure, freely of the film plane. The measuring error for the distance C-E thereby increases gradually from about 0.003 mm within the central important parts of the picture ($\alpha \leq 5°$) to about 0.1 mm at the picture corners. This latter measure, which concerns the least important parts of the picture, is of the same magnitude as the unavoidable deviations from an absolutely plane film. Test exposures have shown that the approximation implied in the application of a planeparallel glass plate does not appreciably affect the quality of the picture.

Figure 2:
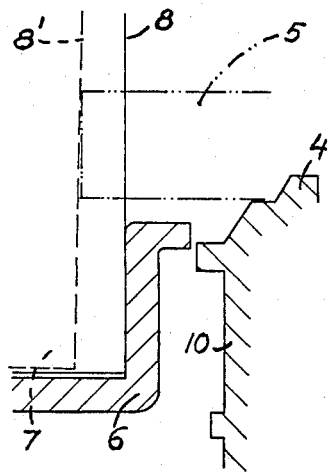
FIG. 2 is a vertical section parallel to the optical axis of the camera through the camera box and depicts an unmodified sheet film magazine within the area about the trigger rod of the camera, FIG. 3 corresponds to FIG. 2, except for the sheet film magazine, which is modified according to the invention.

FIG. 2 shows on an exaggerated scale how a trigger rod 5 projecting out of the camera box presses aside, at the time of exposure, a filmpack 7 stored in an unmodified sheet film magazine 6 and thereby moves the filmpack out of its film plane 8, which here corresponds to the focal plane of the camera, to a plane 8' of shifted position. The result thereof either is either disturbing blur in the picture, or the camera does not work because the camera mechanism is not able to push out the trigger rod 5 a sufficient distance.

Figure 3:
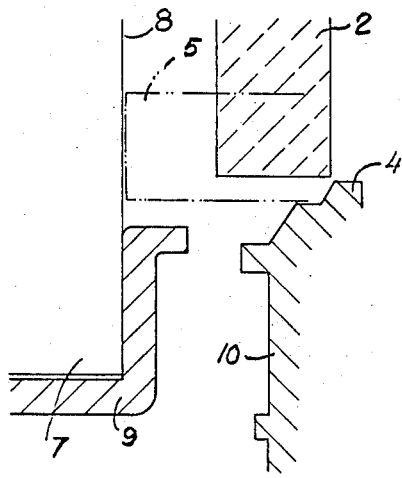

In FIG. 3 showing the same section as FIG. 2 a modified sheet film magazine 9 is provided. The planeparallel glass plate 2 shown in FIG. 1 is here mounted on the film magazine 9 (by holding means not shown) some distance in front of the film plane 8, which now is located behind the focal plane of the camera. As a result, the extension of the distance between the contact surface 10 of the camera box and the film plane 8 is obtained, which was referred to in connection with the description of FIG. 1, and consequently the trigger rod 5 in its outwardly projecting position, FIG. 3, does not reach the film plane 8. The filmpack 7 remains unaffacted and, thus, is still flat.

The invention thereby renders it possible so to modify by simple means a standard sheet film magazine for so-called self-developing film that it can be attached to a photographic camera with exchangeable magazines for rollfilm without having to make structural adjustments on the camera.

I claim:

1. In a camera of the type comprising a housing, a lens, means defining a focal plane rearwardly of said lens, a rollfilm magazine, and means for detachably securing said rollfilm magazine to said housing so that rollfilm in such magazine may be positioned at said focal plane, the improvement comprising a further magazine containing sheet film and adapted to be detachably secured to said housing in replacement of said rollfilm magazine, the sheet film in said further magazine being disposed in a film plane parallel to and rearward of said camera focal plane when said further magazine is secured to said housing, and optical means carried by said further magazine for effectively displacing the focal plane of said camera rearwardly substantially to the film plane of said sheet film in said further magazine.

2. The structure of claim 1 wherein said camera housing includes a trigger rod projecting rearwardly of said housing and adapted to move rearwardly toward said sheet film when said further magazine is secured to said housing, the sheet film in said further magazine being disposed in a plane spaced rearward of said camera focal plane by a distance sufficient to permit free movement of said rod in a direction rearward of said housing without compressing said sheet film.

3. The structure of claim 2 wherein said optical means comprises a glass plate mounted on said further magazine between said film plane and said camera focal plane, said glass plate having a planar boundary surface which is disposed parallel to said film plane.

4. The structure of claim 3 wherein said glass plate comprises a pair of said planar boundary surfaces uniformly spaced from one another whereby said plate has a uniform thickness.

5. The structure of claim 4 wherein the sheet film in said further magazine is of the self-developing type.

* * * * *